United States Patent
Yang et al.

(10) Patent No.: US 9,067,784 B2
(45) Date of Patent: Jun. 30, 2015

(54) HYDROGEN STORAGE MATERIAL AND METHOD OF USING THE SAME

(75) Inventors: Jun Yang, Ann Arbor, MI (US); Andrew Robert Drews, Ann Arbor, MI (US); Andrea Pulskamp, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 348 days.

(21) Appl. No.: 13/489,741

(22) Filed: Jun. 6, 2012

(65) Prior Publication Data

US 2013/0330270 A1 Dec. 12, 2013

(51) Int. Cl.
- *C01B 3/06* (2006.01)
- *C01B 3/00* (2006.01)
- *C01B 6/04* (2006.01)
- *C01B 6/21* (2006.01)

(52) U.S. Cl.
CPC .............. *C01B 3/0026* (2013.01); *Y10T 428/13* (2013.01); *Y02E 60/364* (2013.01); *C01B 3/0078* (2013.01); *C01B 6/04* (2013.01); *C01B 6/21* (2013.01); *Y02E 60/327* (2013.01)

(58) Field of Classification Search
CPC .......... C01B 6/00; C01B 6/003; C01B 6/006; C01B 6/02; C01B 6/06
See application file for complete search history.

(56) References Cited

U.S. PATENT DOCUMENTS

| | | | |
|---|---|---|---|
| 7,790,911 B2 | 9/2010 | Kim et al. | |
| 2006/0194695 A1* | 8/2006 | Au | 502/400 |
| 2010/0090162 A1 | 4/2010 | Mohtadi et al. | |
| 2011/0180753 A1 | 7/2011 | Mohtadi et al. | |

OTHER PUBLICATIONS

Au et al. "Stability and Reversibility of Lithium Borohydrides Doped by Metal Halides and Hydrides", Z Phys. Chem. C 2008,112, 18661-18671 18661.*
Dongan Liu, et al., "Studies of the effects of TiCl3 in LiBH4/CaH2/TiCl3 reversible hydrogen storage system", Journal of Alloys and Compounds 514 (2012) 103-108.
Ji Young Lee, et al., "Metal halide doped metal borohydrides for hydrogen storage: The case of Ca(BH4)2-CaX2 (X=F, Cl) mixture", Journal of Alloys and Compounds 506 (2010) 721-727.
Ming Au, et al., "Stability and Reversibility of Lithium Borohydrides Doped by Metal Halides and Hydrides", J. Phys. Chem. C 2008, 112, 18661-18671.
Lene Mosegaard, et al., "Reactivity of LiBH4: In Situ Synchrotron Radiation Powder X-ray Diffraction Study", J. Phys. Chem. C 2008, 112, 1299-1303.
Lene M. Arnbjerg, et al., "Structure and Dynamics for LiBH4-LiCl Solid Solutions", Chem. Mater. 2009, 21, 5772-5782.

* cited by examiner

*Primary Examiner* — Stanley Silverman
*Assistant Examiner* — Syed Iqbal
(74) *Attorney, Agent, or Firm* — Damian Porcari; Brooks Kushman P.C.

(57) ABSTRACT

In one embodiment, a method of using hydrogen includes forming a crystalline solid mixture of a metal halide $M^2(H_L)_y$ with a metal borohydride $M^1(BH_4)_x$; and forming an amorphous liquid mixture from the crystalline solid mixture.

18 Claims, 7 Drawing Sheets

HYDROGEN STORAGE MATERIAL AND METHOD OF USING THE SAME

TECHNICAL FIELD

The present invention relates to a hydrogen storage material involving an amorphous liquid mixture of a metal borohydride and a metal halide and method of using the same.

BACKGROUND

Certain metal hydrides and metal borohydrides have been used for hydrogen storage. However, these metal hydrides and metal borohydrides have limited use because of necessary energy expenditures involved in maintaining relatively high temperatures for hydrogen desorption. In addition, borohydrides are not typically able to be rehydrided after hydrogen release. There is a continuing need for hydrogen storage materials with industrially acceptable cost efficiency for operation and maintenance.

SUMMARY

In one embodiment, a method of using hydrogen includes forming a crystalline solid mixture of a metal halide $M^2(H_L)_y$ with a metal borohydride $M^1(BH_4)_x$; and forming an amorphous liquid mixture from the crystalline solid mixture.

The method may further include forming a hexagonal metal borohydride [h-$M^1(BH_4)_x$] from an orthorhombic metal borohydride [o-$M^1(BH_4)_x$] and combining the former with the metal halide to form the crystalline solid mixture.

The method may further include combining the amorphous liquid mixture with a metal hydride $M^3H_z$ to form a hydrogen storage material.

The method may further include heating the hydrogen storage material to form a dehydrogenated composition while hydrogen is released. The method may further include cooling the dehydrogenated composition to form a cooled dehydrogenated composition. The method may further include inputting hydrogen into the cooled dehydrogenated composition to form a recharged hydrogen storage composition.

In another embodiment, a hydrogen storage material includes a crystalline solid mixture of a metal borohydride $M^1(BH_4)_x$ and a metal halide $M^2(H_L)_y$; and an amorphous liquid mixture formed from at least a portion of the solid solution, wherein, upon an X-Ray Diffraction analysis, the crystalline solid mixture presenting one or more peaks and the amorphous liquid mixture presenting no measurable peaks.

DETAILED DESCRIPTION

Figure 1A:
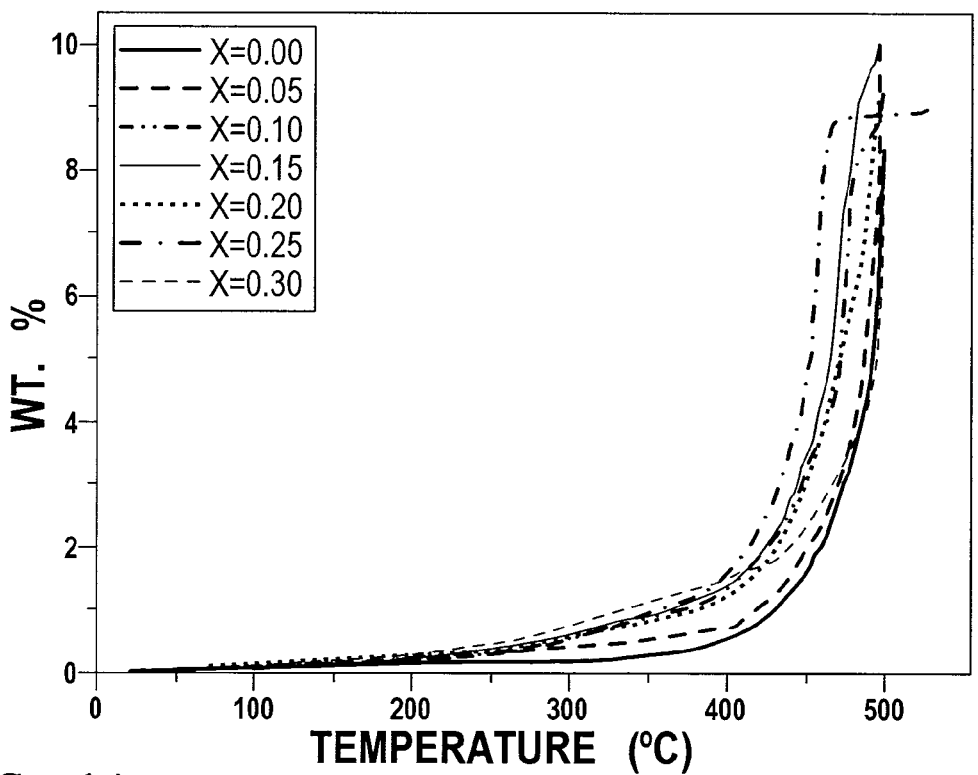
FIG. 1A illustratively depicts kinetic desorption data to 1 bar $H_2$ for $6LiBH_4/CaH_2/xTiCl_3$ nano-composites as a function of temperature.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Complex hydrides are considered promising candidates for solid-state hydrogen storage materials because of their high theoretical hydrogen storage capacity and widely tailorable hydrogen desorption temperatures through forming mixtures with other materials. Within this class of materials, metal borohydrides, such as $LiBH_4$, $Mg(BH_4)_2$ and $Ca(BH_4)_2$, have received special attention due to their high theoretical gravimetric and volumetric hydrogen densities. These metal borohydrides alone are limited for practical on-board fuel cell hydrogen storage application at least because they often require relatively high temperatures for hydrogen releases.

In one or more embodiments, the present invention is advantageous in providing a ternary system of a metal hydride, a metal borohydride and a metal halide for storing and releasing hydrogen. Without wanting to be limited to any particular theory, it is believed that addition of the metal halide into the metal borohydride helps to form an intermediary compound between the two, which, upon reaction with the metal hydride, facilitates hydrogen releases in a relatively lower temperature range.

In one embodiment, a method of using hydrogen includes forming a crystalline solid mixture of a metal halide $M^2(H_L)_y$ with a metal borohydride $M^1(BH_4)_x$; and forming an amorphous liquid mixture from at least a portion of the crystalline solid mixture. The method may further include forming a hexagonal metal borohydride[h-$M^1(BH_4)_x$] from an orthorhombic metal borohydride [o-$M^1(BH_4)_x$] and combining the former with the metal halide to form the solid solution.

The term "crystalline solid mixture" may alternatively be referred to as a solid solution. The term "amorphous liquid mixture" may alternatively be referred to as a molten liquid solution.

In the solid solution, the metal borohydride $M^1(BH_4)_x$ and the metal halide $M^2(H_L)_y$ are mixed such that the solid solution is substantially homogenous. The term "substantially" may refer to the extent of the homogeneity, in that less than 15 percent, 10 percent, 5 percent, or 1 percent by weight of the total weight of the solid solution consists of either the metal borohydride $M^1(BH_4)_x$ or the metal halide $M^2(H_L)_y$ alone.

In the liquid molten solution, the metal borohydride $M^1(BH_4)_x$ and the metal halide $M^2(H_L)_y$ are mixed such that the liquid molten solution is substantially homogenous. The term "substantially" may refer to the extent of the homogeneity, in that less than 15 percent, 10 percent, 5 percent, or 1 percent by weight of the total weight of the liquid molten solution consists of either the metal borohydride $M^1(BH_4)_x$ or the metal halide $M^2(H_L)_y$ alone.

For the metal borohydride $M^1(BH_4)_x$ and metal halide $M^2(H_L)_y$, $M^1$ and $M^2$ are each independently an alkali metal or an alkaline earth metal, with x and y to charge balance. In certain instances, the values of x and y are $1 \leq x \leq 2$ and/or $1 \leq y \leq 2$.

The term "hexagonal" may refer to a crystal structure including one or more of the following features: the lattice parameters on the base plane are substantially equal to each other, the angle between the lattice parameters is about 120°, the vertical axis is substantially perpendicular to the basal plane, and the lattice parameter for the vertical axis different from one or both of the lattice parameters on the base plane.

The term "orthorhombic" may refer to a crystal structure including one or more of the following features: the lattice parameters on the base plane are substantially not equal to each other, the vertical axis is substantially perpendicular to the basal plane, and the lattice parameter for the vertical axis is different from both of the lattice parameters on the base plane.

The hexagonal metal borohydride[h-$M^1(BH_4)_x$] may include one or more lattice cavities, and at least a portion of the metal halide $M^2(H_L)_y$ may be positioned within the one or more lattice cavities of the hexagonal metal borohydride[h-$M^1(BH_4)_x$]. When present at an elevated temperature, the metal halide $M^2(H_L)_y$ and the hexagonal metal borohydride [h-$M^1(BH_4)_x$] together form a molten solution having a viscosity value greater than a viscosity value of the hexagonal [h-$M^1(BH_4)_x$] compared at the elevated temperature.

To the molten solution a metal hydride $M^3H_z$ may be added. $M^3$ is an alkali metal or an alkaline earth metal, with z to charge balance. In certain instances, the value of z is $1 \leq z \leq 2$. Optionally the metal borohydride $M^1(BH_4)_x$, the metal halide $M^2(H_L)_y$ and the metal hydride $M^3H_z$ may be all packaged in a container prior to one or more of the heating steps as described herein.

The orthorhombic metal borohydride [o-$M^1(BH_4)_x$] may be heated to form the hexagonal metal borohydride[h-$M^1(BH_4)_x$]. Prior to heating, the orthorhombic metal borohydride [o-$M^1(BH_4)_x$] may be kept at room temperature or 25 degrees Celsius. The heating may be carried out at a constant heating rate, at a variable rate, or both. Non-limiting examples of the heating rate include a heating rate of from 0.1 to 200° C. per minute. For the purpose of heating, any suitable heating devices may be used. Non-limiting examples of the heating devices include resistive heating band, catalytic hydrogen burner, flash light heating, and exhaust heating from the coolant of fuel cell or internal combustion engines. Any subsequent steps may be initiated when 90 weight percent or more of the orthorhombic metal borohydride [o-$M^1(BH_4)_x$] has been transformed into hexagonal metal borohydride [h-$M^1(BH_4)_x$]. In certain instances, the heating may be carried out at a first temperature of from no less than 15° C., 25° C., 35° C., 45° C., 55° C., 65° C., 75° C., 85° C., or 95° C., to no more than 180° C., 170° C., 160° C., 150° C., 140° C., 130° C., 120° C., or 110° C.

The solid solution of $M^2(H_L)_y$ and $M^1(BH_4)_x$, and particularly [h-$M^1(BH_4)_x$], may be formed at a second temperature greater than the first temperature. The liquid molten solution may be formed from the solid solution at a third temperature greater than the second temperature. The mixture may be formed as a molten solution of $M^2(H_L)_y$ and [h-$M^1(BH_4)_x$] with a viscosity value greater than a viscosity value of $M^1(BH_4)_x$ compared at a given temperature. The metal hydride $M^3H_z$ may be added to the mixture of $M^2(H_L)_y$ and [h-$M^1(BH_4)_x$] after the formation of the mixture of $M^2(H_L)_y$ and [h-$M^1(BH_4)_x$]. The second temperature may be of from no less than 90° C., 100° C., 110° C., 120° C., 130° C., 140° C., 150° C., or 160° C., to no more than 220° C., 210° C., 200° C., 190° C., 180° C., 170° C., 160° C., or 150° C. The third temperature may be of from no less than 190° C., 200° C., 210° C., 220° C., 230° C., 240° C., 250° C., or 260° C., to no more than 360° C., 350° C., 340° C., 330° C., 320° C., 310° C., 300° C., or 290° C.

The term "liquid molten solution" may refer to a homogeneous liquid formed when the solid solution melts. In this connection, there is no measurable compositional separation among the individual components contained within the molten solution. Because the liquid molten solution is a liquid and not a solid, the liquid molten solution presents no measurable peaks upon an X-ray diffraction analysis.

The term "viscosity" may refer to the easiness of movement of the molten solution. The more viscous the molten solution, the less likely the molten solution will segregate, facilitating the reaction between the metal hydride with the liquid molten solution.

The method may further include heating the hydrogen storage composition to form a dehydrogenated composition and to release hydrogen. One non-limiting benefit of the method is that now hydrogen may be released at a temperature such as 360° C. to 380° C., compared to a relatively higher temperature of from 390° C. to 430° C. The dehydrogenated composition may be cooled to form a cooled dehydrogenated composition. Fresh hydrogen may be inputted into the cooled dehydrogenated composition to form a recharged hydrogen storage composition.

Non-limiting examples of the metal borohydride $M^1(BH_4)_x$ include lithium borohydride, sodium borohydride, potassium borohydride, calcium borohydride, strontium borohydride, barium borohydride, aluminum borohydride, and combinations thereof.

The halogen ion $H_L$ of the metal halide $M^2(H_L)_y$ may be a chloride, a bromide or an iodide. Non-limiting examples of the metal chloride $M^2(Cl)_y$ include magnesium chloride, calcium chloride, strontium chloride, barium chloride, zirconium chloride, titanium chloride and combinations thereof. Non-limiting examples of the metal bromide $M^2(Br)_y$ include magnesium bromide, calcium bromide, strontium bromide, barium bromide, zirconium bromide, titanium bromide and combinations thereof. Non-limiting examples of the metal iodide $M^2(I)_y$ include magnesium iodide, calcium iodide, strontium iodide, barium iodide, zirconium iodide, titanium iodide and combinations thereof.

Non-limiting example of the metal hydride $M^3H_z$ include lithium hydride, sodium hydride, magnesium hydride, calcium hydride, titanium hydride, and zirconium hydride, and combinations thereof.

Reversible incorporation of the metal borohydride $M^1(BH_4)_x$ into and its precipitation out from the molten solution of $[M^1(BH_4)_x] \cdot [M^2(H_L)_y]$ is believed to result in much improved reversibility. In this connection, the more viscous molten solution will prevent excessive clustering of the molten metal borohydride and the coalescence of metal hydride, preserving the nano-sized phase arrangement in the composites. During recharging, the reincorporation of metal halide into metal borohydrides as they form increases the viscosity of the molten solution, preserving the nano-sized solid-liquid phase arrangement, resulting in good hydrogen reaction reversibility.

Without wanting to be limited to any particular theory, it is believed that adding metal halides into metal borohydrides and metal hydrides nano-composites may improve the hydrogen storage property of the nano-composites in one or more of the following ways: via improving reaction thermodynamics, thus possibly decreasing the hydrogen desorption temperature; improving hydrogen reaction kinetics of the ternary system, and improving hydrogen reaction reversibility.

The metal borohydride $M^1(BH_4)_x$, the metal halide $M^2(H_L)_y$ and the metal hydride $M^3H_z$ may be combined using a ball mixing or milling procedure. Following the ball milling procedure, the mixed material may be subjected to a temperature treatment at a temperature of 180 to 300° C. One or more of the resulting products may have a lower hydrogen desorption temperature and faster desorption kinetics compared to the initial metal borohydride or metal hydride materials. Additionally, the third material of the process may be reversibly hydrogenated after release of an initial hydrogen composition.

As will be detailed in the Example section, a non-limiting ternary system may involve the following reaction(s). $6LiBH_4 + 0.75 \ LiCl + CaH_2 \Leftrightarrow 6LiBH_4 \cdot 0.75LiCl + CaH_2 \Leftrightarrow 6LiBH_4 \cdot 0.75LiCl + CaH_2 \Leftrightarrow CaB_6 + 0.75LiCl + 10H_2 + 6LiH$. In this system, the three compounds are provided in a molar ratio of 6:0.75:1. These ratios may be particularly helpful to facilitate the formation of first a solid solution and later a liquid molten solution. When heated to certain temperatures such as 110° C. to 130° C., $LiBH_4$ and LiCl together form a solid solution $6LiBH_4 \cdot 0.75LiCl$. The presence of the liquid molten solution in comparison to the solid solution may be determined via X-ray Diffraction (XRD). The solid solution $6LiBH_4 \cdot 0.75LiCl$ remains stable for a temperature range of up to 260° C. to 300° C., beyond which, the solid solution starts to melt to form a molten solution. Without wanting to be limited to any particular theory, it is believed that the solid solution and the liquid molten solution are each directed to a different state of the same chemical composition. In the state of the liquid molten solution, the $6LiBH_4 \cdot 0.75LiCl$ molecule moves relatively easily and has relatively better contact with the other reactants.

Up till this point, $CaH_2$ does not react or is not a reactant yet, at least because $CaH_2$ is too stable to react. $CaH_2$ may be added in the beginning of the reactions or at a later time. $CaH_2$ may be added in the beginning along with all other ingredients to simply the process. When further heated to about 330° C. to 370° C., hydrogen releasing reaction occurs between the molten solution of $LiBH_4 \cdot LiCl$ and $CaH_2$, releasing $H_2$ and forming $CaB_6$. In this process, as the molten $LiBH_4 \cdot LiCl$ solution reacts with $CaH_2$, LiCl precipitates out. Therefore, the reactants are molten $LiBH_4 \cdot LiCl$ and $CaH_2$ instead of molten $LiBH_4$ and $CaH_2$. This reaction pathway is believed to be coupled with favorable reaction thermodynamics and kinetics, and with lowered hydrogen desorption temperatures in particular. The reaction thermodynamics makes this reaction reversible and the reversibility may be examined by testing the charging/discharging repeatability.

The metal halide may be added to the metal hydride and/or the metal borohyride or may be formed as a reaction product using the metal borohydride as a reactant. For instance, LiCl may be formed through a replacement reaction between $TiCl_3$ and $LiBH_4$.

EXAMPLE

Lithium borohydride ($LiBH_4$) (95% purity, Sigma-Aldrich), calcium hydride ($CaH_2$) (98% purity, Alfa-Aesar) and titanium chloride ($TiCl_3$) (95% purity, Sigma-Aldrich) are used as received. All sample handling is performed in aMBraunLabmaster 130 glovebox maintained under an argon atmosphere. Mechanical milling is carried out using a Spex 8000 high energy mixer/mill for samples loaded into a milling vial containing two stainless steel balls weighing 8.4 grams each. The mixture is ball milled for 5 hours. For the $6LiBH_4 + CaH_2 + xTiCl_3$ system, its molar ratio is 6:1:x (x=0, 0.05, 0.1, 0.15, 0.2, 0.25 and 0.3).

Variable temperature hydrogen desorption kinetics are characterized using a water displacement desorption (WDD) apparatus where the desorbed gas amount is directly monitored as a function of temperature. For each experiment, a certain amount of sample is loaded into a stainless steel autoclave in the glove box. The sealed autoclave is mounted onto a three-port manifold connected to hydrogen purge gas as well as an outlet tube which passes through the bottom of a water-filled graduated burette. The manifold and sample are purged with hydrogen prior to each experiment. Each sample is heated at a rate (5° C./min) from room temperature to the final set point (up to 500° C.), and the desorbed hydrogen volume is monitored based on the amount of water displaced. The amount of desorbed hydrogen is corrected for the reduced headspace pressure and thermal expansion of 1 bar hydrogen gas upon sample heating. Dehydrogenation is performed in the WDD at selected temperature and hydrogen pressure, and reversibility is characterized through desorption using WDD.

Phase transformation and chemical reactions occurring when the samples are heated at a controlled heating rate are investigated using differential scanning calorimetry (DSC). Samples are placed inside aluminum crucibles and sealed with pierced lids made of the same material in the glove box. The data are collected under flowing helium (20 ml/min) within a temperature range of 20° C. to 500° C. using a heating rate of 5° C./min.

Phase identification and purity detection are characterized by Powder X-ray Diffraction (PXRD). PXRD data are collected on a SCINTAG (XDS2) powder diffractometer operated at 45 kV and 40 mA with step increments of 0.02° measured during 0.5 s using Cu Kα radiation ($\lambda = 1.5418 A^O$).

All samples are loaded in the glovebox with mineral oil to keep from air and maintained under a $N_2$ atmosphere during data collection. High-temperature X-ray diffraction data are collected using a Bueler HDK 2.4 furnace chamber attached to a Scintag X1 diffractometer, an Intel CPS 120 position sensitive detector and collimated Cu Kα radiation. Data are collected under an atmosphere of flowing purified nitrogen (200 sccm) while the temperature is ramped at a constant rate of 2° C./min from 4° C. to 300° C. with an interval of 40° C. Once the temperature reaches each set point, it holds at that temperature for 15 minutes to collect data. The phase identification above 300° C. is obtained using PXRD after desorbing the nano-composite at the selected temperatures until no further hydrogen is released and then the sample is cooled to room temperature rapidly by quenching into water.

In this experiment, samples of ternary compositions $6LiBH_4/CaH_2/xTiCl_3$ with variable $TiCl_3$ concentrations (x=0, 0.05, 0.1, 0.15, 0.2, 0.25 and 0.3) are used. As detailed herein, LiCl is produced during ball milling of $6LiBH_4/CaH_2/xTiCl_3$ and as temperature increases, $o\text{-}LiBH_4$ transforms into $h\text{-}LiBH_4$, into which LiCl incorporates, forming solid solution of $LiBH_4.LiCl$, which melts at or above 280° C. Molten $LiBH_4.LiCl$ is more viscous than molten $LiBH_4$, preventing the clustering of $LiBH_4$ and the accompanied agglomeration of $CaH_2$, and thus preserving the nano-sized phase arrangement formed during ball milling. At or above 350° C., the molten solution $LiBH_4.LiCl$ reacts with $CaH_2$, precipitating LiCl out of the molten solution $LiBH_4.LiCl$. The main hydrogen desorption reaction then proceeds between the molten solution $LiBH_4.LiCl$ and $CaH_2$ and not between $LiBH_4$ and $CaH_2$. This alters the hydrogen reaction thermodynamics and lowers the hydrogen desorption temperature. In addition, the solid-liquid nano-sized phase arrangement in the nano-composites improves the hydrogen reaction kinetics. The reversible incorporation/precipitation of LiCl at the hydrogen reaction temperature and during temperature cycling (cooling down slowly and heating up through the phase transformation temperature of $LiBH_4$ at about 110° C.) makes the $6LiBH_4/CaH_2/0.25TiCl_3$ nano-composite a fully reversible hydrogen storage material.

Samples $6LiBH_4/CaH_2/xTiCl_3$ are ball milled for five hours to produce nano-composites. There are composites on the nano-meter size scale, wherein components of different phases have close contact with each other. The implications will be improved reaction kinetics due to good contacts between the phases. In some cases, the thermodynamic properties may be changed too due to the surface energy contributions. FIG. 1A shows the kinetic desorption data of each nano-composite of $6LiBH_4/CaH_2/xTiCl_3$ system with a ratio 6:1:x (x=0.05, 0.1, 0.15, 0.2, 0.25 and 0.3). From FIG. 1A, the samples show at least two desorption steps: One smaller desorption step below 400° C. and the second main desorption step between 400° C. and 500° C. Adding $TiCl_3$ decreases the temperature of hydrogen desorption, and increases the amount of hydrogen released at the same temperature. The samples with 0.1, 0.15 and 0.2 $TiCl_3$ show similar dehydrogenation kinetics. The sample with 0.25 $TiCl_3$ illicits relatively greater dehydrogenation kinetics.

Figure 1B:
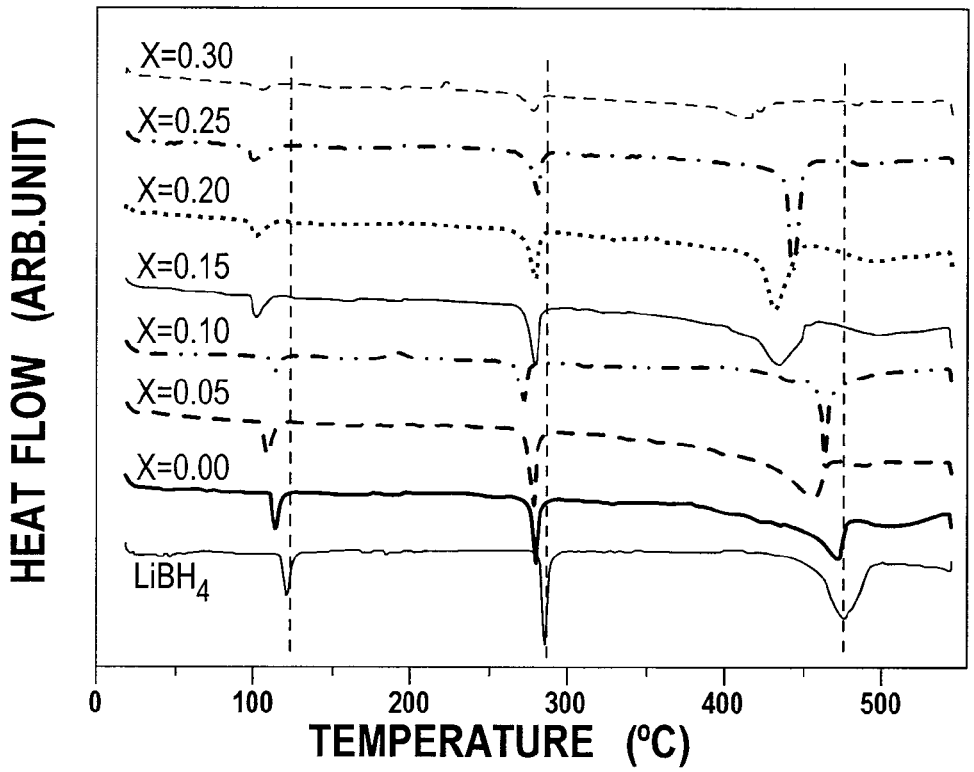
FIG. 1B illustratively depicts DSC curves of the $6LiBH_4/CaH_2/xTiCl_3$ nano-composites.

Phase transformation and hydrogen desorption through chemical reactions of the post-milled samples of $6LiBH_4/CaH_2/xTiCl_3$ are also analyzed by differential scanning calorimetry (DSC) as shown in FIG. 1B. In each curve, three distinct endothermic peaks can be observed. The $1^{st}$ peak, observed around 110° C., is believed to correspond to the polymorphic phase transition of $LiBH_4$ from orthorhombic ($o\text{-}LiBH_4$) to hexagonal ($h\text{-}LiBH_4$) structure. The $2^{nd}$ peak, observed around 280° C., is believed to correspond to the melting of $LiBH_4$. The $3^{rd}$ peak corresponds to the main hydrogen desorption of the nano-composite between 400° C. and 500° C., which is consistent with the temperature range from the kinetic desorption data shown in FIG. 1A. Forming the molten solution of $LiBH_4.LiCl$ does not necessarily lower the phase transition temperature ($1^{st}$ peak) and the melting temperature ($2^{nd}$ peak) of $LiBH_4$. However, for the $3^{rd}$ peak, which corresponds to the main hydrogen desorption, adding $TiCl_3$ significantly lowers the reaction temperature, especially at higher concentration of $TiCl_3$, which confirms that adding $TiCl_3$ improves the hydrogen desorption thermodynamics of the nano-composites.

Figure 1C:
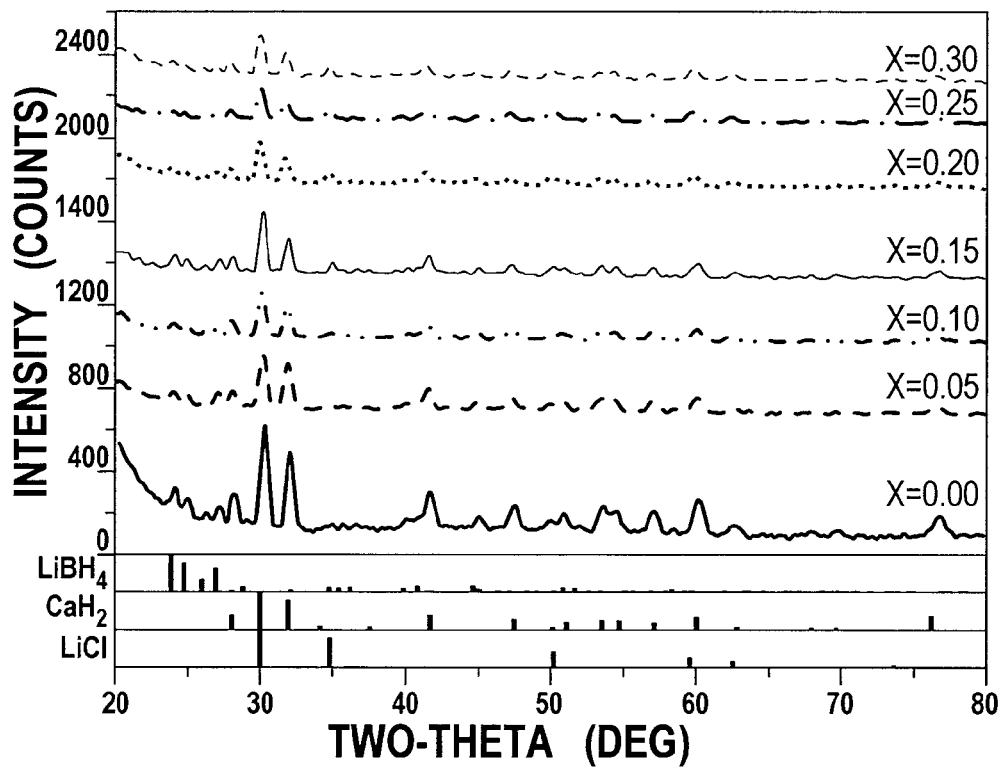
FIG. 1C illustratively depicts room-temperature (RT) PXRD (Powder X-Ray Diffraction) patterns and corresponding phase identification for the post-milled $6LiBH_4/CaH_2/xTiCl_3$ nano-composites.

Powder X-Ray Diffraction (PXRD) is used to identify the phases of the post-milled and desorbed nano-composites. FIG. 1C shows the PXRD patterns and corresponding phase identification for the post-milled $6LiBH_4/CaH_2/xTiCl_3$ nano-composites. From FIG. 1C, it can be seen that the post-milled nano-composite of $6LiBH_4/CaH_2$ (without adding $TiCl_3$) is a physical mixture of $LiBH_4$ and $CaH_2$. When $TiCl_3$ is added, peaks of LiCl begin to appear but no peaks of $TiCl_3$ are observed and the peaks of LiCl become stronger with increasing amounts of $TiCl_3$, accompanied by a loss of $LiBH_4$ peak intensity, while $CaH_2$ stays intact during ball milling. Taken together, these results suggest that $LiBH_4$ and $TiCl_3$ undergo a replacement reaction where LiCl is produced.

Figure 1D:
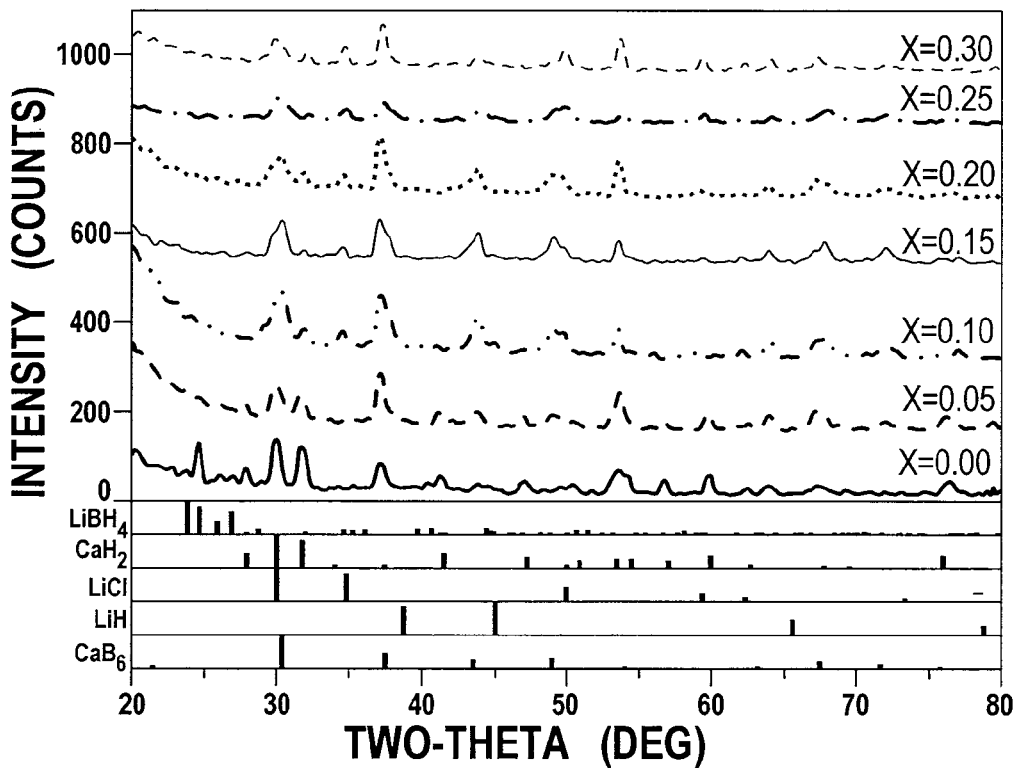
FIG. 1D illustratively depicts RT PXRD patterns for $6LiBH_4/CaH_2/xTiCl_3$ nano-composites after desorption to 500° C.
Figure 2A:
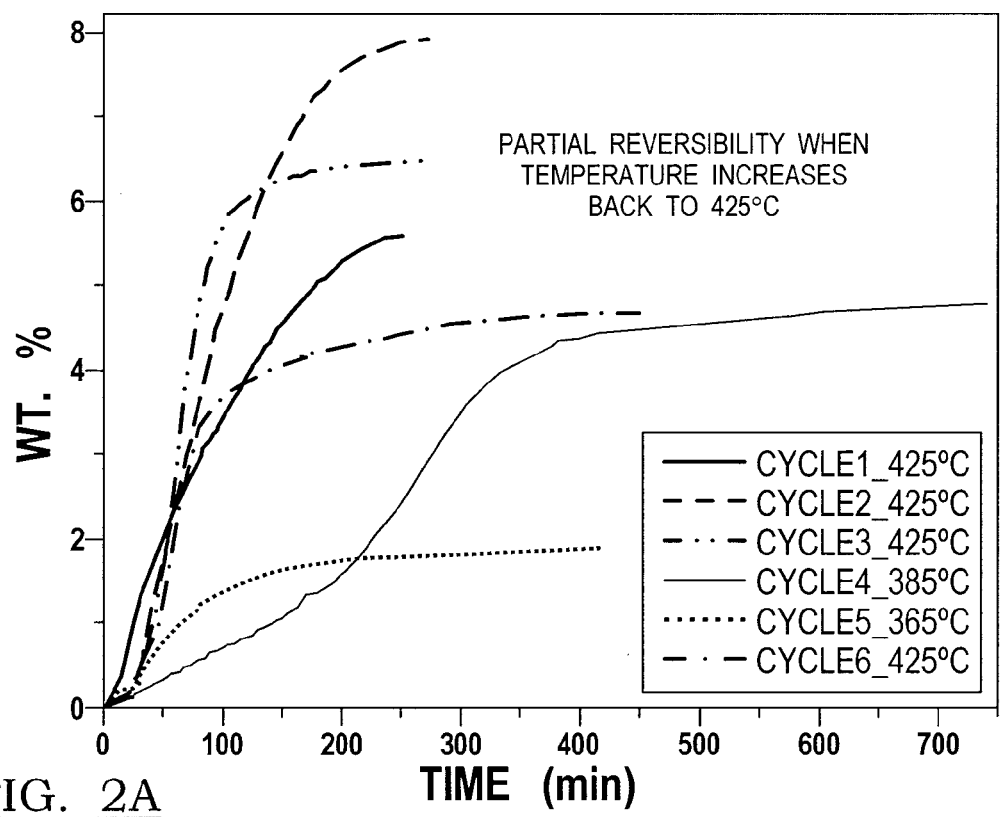
FIG. 2A illustratively depicts hydrogen absorption/desorption reversibility of $6LiBH_4/CaH_2$ nano-composite.
Figure 2B:
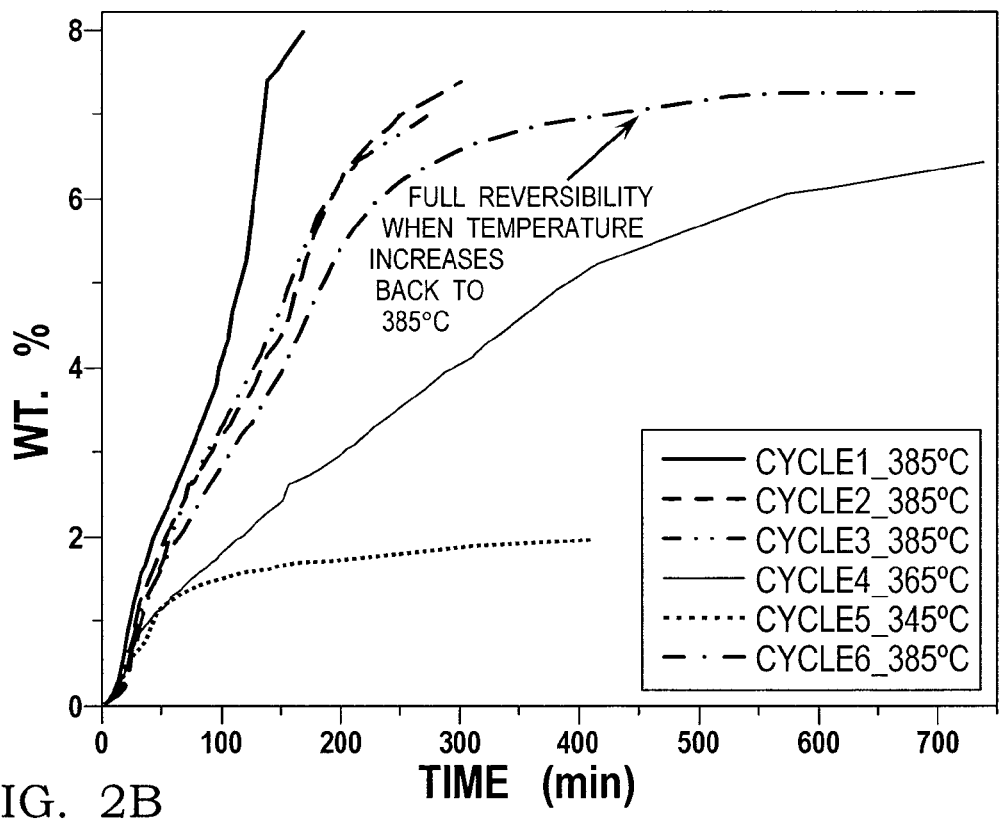
FIG. 2B illustratively depicts hydrogen absorption/desorption reversibility of the $6LiBH_4/CaH_2/0.25TiCl_3$ nano-composite.

FIG. 1D shows the PXRD patterns for the $6LiBH_4/CaH_2/xTiCl_3$ nano-composites after desorbing at 500° C. for 10 hours to 1 bar $H_2$ atmosphere. As shown in FIG. 1D, for low concentrations of $TiCl_3$ (x=0, 0.05) un-reacted $LiBH_4$ remains, at higher concentrations, the peaks of $LiBH_4$ and $CaH_2$ disappear while peaks of LiCl, LiH and $CaB_6$ begin to emerge and grow stronger. This suggests that the post-milled nano-composite samples may undergo one or more reactions by which LiH and $CaB_6$ are formed. Reaction shown below represents a non-limiting example: $3xLiCl+xTi(BH_4)_3+(6-3x)LiBH_4+CaH_2 \leftrightarrow (6-3x)LiH+CaB_6+(10+0.5x)H_2+3xLiCl+xTiH_2$ The hydrogen absorption/desorption reversibility is also studied using nano-composites of $6LiBH_4/CaH_2$ without 0.25 $TiCl_3$. FIG. 2A shows that for the first three cycles, the nano-composite of $6LiBH_4/CaH_2$ shows a normal reversibility upon charging and desorbing at 425° C. When the desorption temperatures are decreased to 385° C. and 365° C. respectively ($4^{th}$ and $5^{th}$ cycles), the desorption kinetics and the amount of desorbed hydrogen decrease significantly. After the recharging and desorbing temperatures were raised to 400° C. ($6^{th}$ cycle) and 425° C. ($7^{th}$ cycle), the desorbed hydrogen capacity is only partially recovered. On the other hand, FIG. 2B shows that the as-milled $6LiBH_4/CaH_2/0.25TiCl_3$ nano-composite exhibits good reversibility for the first three cycles when desorbing at 385° C. When lowering the charging and desorbing temperatures to 365° C. and 345° C., both the kinetics and desorption capacity are decreased, as shown in the $4^{th}$ and $5^{th}$ cycles, respectively. However, when the recharging and desorbing temperature is set back to 385° C., shown as the $6^{th}$ cycle, the desorbed hydrogen amount and desorption kinetics return almost to the initial level. Therefore, it can be seen that adding 0.25 $TiCl_3$ into the $6LiBH_4/CaH_2$ nano-composite can also significantly improve its reversibility.

Figure 2C:
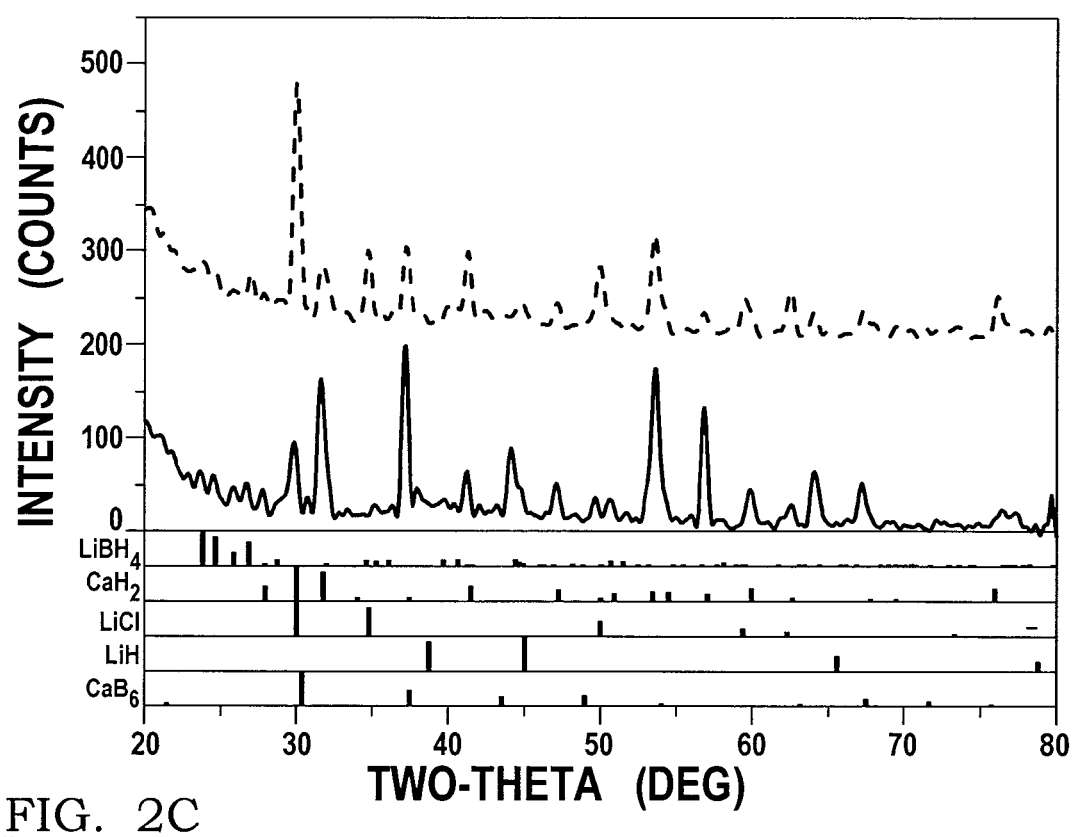
FIG. 2C illustratively depicts PXRD patterns of the two nano-composites after recharging and cooled to room temperature in air.

FIG. 2C shows the PXRD patterns of the recharged $6LiBH_4/CaH_2$ and $6LiBH_4/CaH_2/0.25TiCl_3$ nano-composites after the reversibility cycles of FIG. 2A to 2C. As shown in FIG. 2C, after recharging in 170 bar $H_2$ at 425° C. and 385° C. respectively, both $6LiBH_4/CaH_2$ and $6LiBH_4/CaH_2/0.25TiCl_3$ nano-composites returns to a mixture of primarily LiBH$_4$ and CaH$_2$, which confirms the reversibility of the reaction between LiH+CaB$_6$ and LiBH$_4$+CaH$_2$ as shown in reaction (2).

Figure 3A:
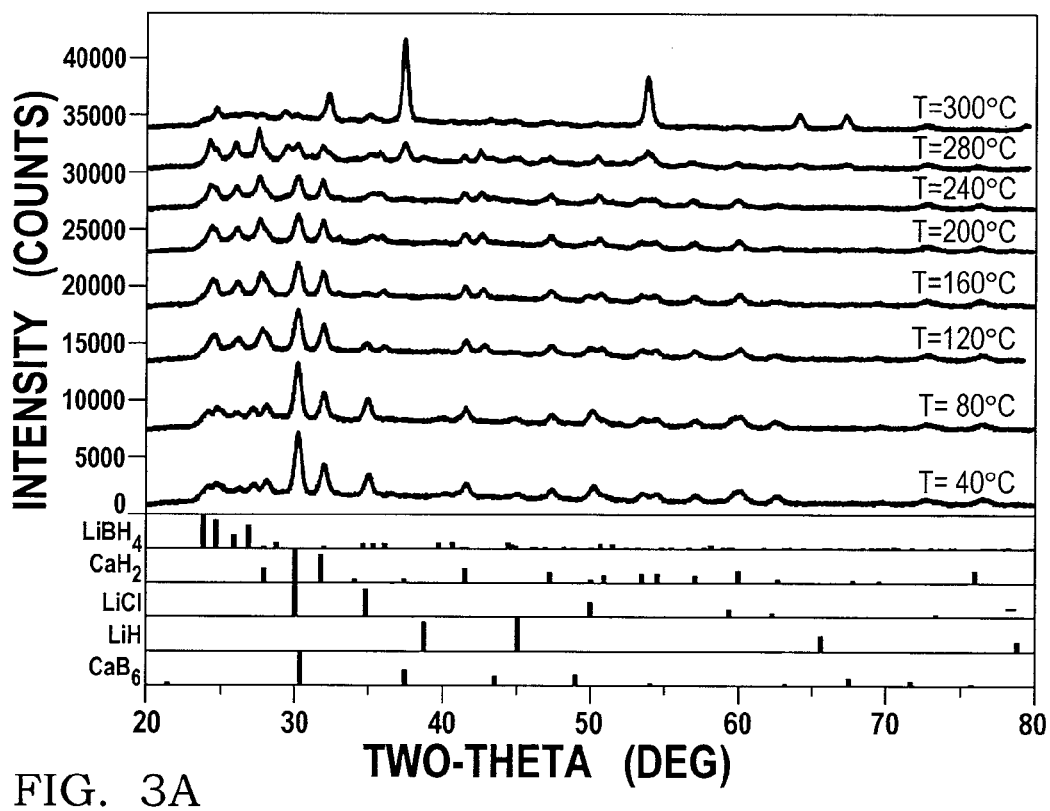
FIG. 3A illustratively depicts In-situ PXRD patterns for $6LiBH_4/CaH_2/0.25TiCl_3$ nano-composite from 40° C. to 300° C.

Phase changes of the 6LiBH$_4$/CaH$_2$/0.25TiCl$_3$ nano-composite samples can be examined via in-situ PXRD. As depicted in FIG. 3A, LiBH$_4$ transforms from o-LiBH$_4$ to h-LiBH$_4$ between 80° C. and 120° C., which is consistent with the first endothermic peak (110° C.) in FIG. 1B. Above 280° C., CaB$_6$ and LiH begin to appear accompanied by a weakening of LiBH$_4$ and CaH$_2$ peaks, consistent with reaction (2). More importantly, the LiCl peaks become weaker as temperatures are increased from room temperature and disappear when the temperature exceeds 120° C. (phase transition temperature from o-LiBH$_4$ to h-LiBH$_4$), which suggests that LiCl incorporates into h-LiBH$_4$ to form a solid solution of LiBH$_4$.LiCl.

Figure 3B:
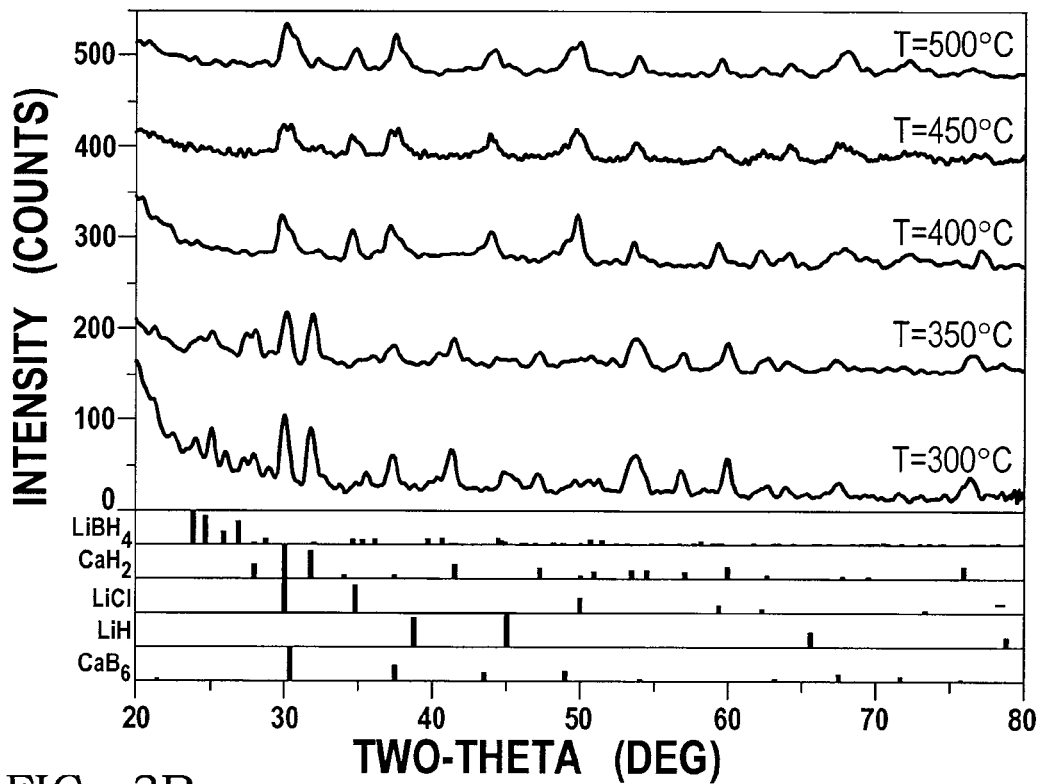
FIG. 3B illustratively depicts PXRD patterns of quenched $6LiBH_4/CaH_2/0.25TiCl_3$ nano-composites after desorbing for 10 hours at 300° C., 350° C., 400° C., 450° C., and 500° C., respectively.

As LiBH$_4$.LiCl solid solution melts, the main hydrogen releasing reaction starts to take place. Hence, for the temperature from 300° C. to 500° C., five nano-composites are desorbed each at a specific temperature for 10 hours to 1 bar H$_2$ pressure (300, 350, 400, 450 and 500° C.), respectively, and then quenched to room temperature. Powder XRD patterns of those five quenched post-desorbed samples are used to identify phases after higher temperature hydrogen desorption, as shown in FIG. 3B. LiBH$_4$ and CaH$_2$ are observed in samples quenched at 300° C. to 350° C., although their peak intensities keep decreasing. Differences seen between FIGS. 3A and 3B at 300° C. may be attributable to the recrystallization of the molten LiBH$_4$. It is noteworthy that after desorption at 350° C. for 10 hours to 1 bar H$_2$, the quenched sample does not show LiCl peaks, suggesting that the molten solution of LiBH$_4$.LiCl at 350° C. is frozen into a solid solution. Above 400° C., peaks of CaB$_6$ and LiH become stronger along with the disappearance of LiBH$_4$ and CaH$_2$, which is consistent with reaction (2). Contrary to the case at 350° C., peaks of LiCl emerge again from 400° C. to 500° C. while LiBH$_4$ disappears due to the hydrogen reaction (2). Hence, during the hydrogen desorption process, LiCl in 6LiBH$_4$/CaH$_2$/0.25TiCl$_3$ nano-composite first forms solid solution (LiBH$_4$.LiCl) with LiBH$_4$, which becomes molten solution (LiBH$_4$.LiCl) as temperatures are increased to about 280° C., and then precipitates out after LiBH$_4$ reacts with CaH$_2$, forming CaB$_6$ and LiH.

The phase transformation of o-LiBH$_4$ to h-LiBH$_4$ and the dissolution of LiCl into h-LiBH$_4$ to form LiBH$_4$.LiCl first as solid solution and then as a molten solution can be observed via in-situ XRD. The LiBH$_4$.LiCl remains stable up to the onset of the main hydrogen reaction between the LiBH$_4$.LiCl (liquid) and CaH$_2$ (solid), forming CaB$_6$, LiH and releasing hydrogen. As LiBH$_4$ in the molten solution is being consumed, LiCl gradually precipitates out of the molten solution as a solid again. This process can be schematically illustrated in terms of microstructural transformations and the nano-sized phase arrangement, as can be observed from the XRD data of the quenched samples as shown in FIGS. 4A to 4D.

Figure 4A:
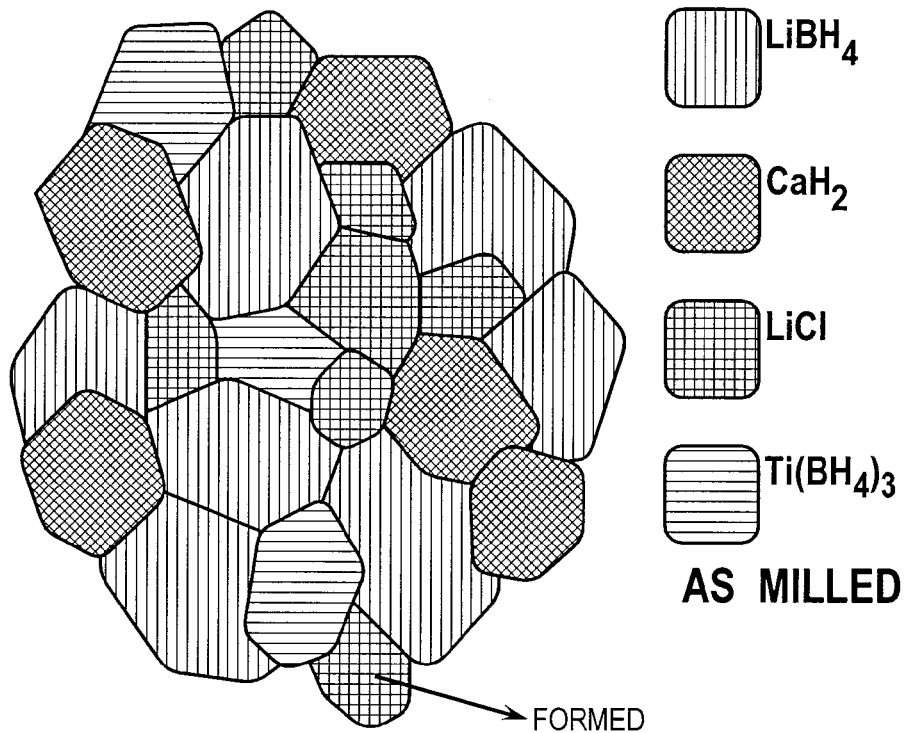
FIG. 4A-4B illustratively depict schematic microstructure and phase transformations of $6LiBH_4+CaH_2+0.25TiCl_3$ nano-composite: (4A) after-milling; (4B) 120° C. to 280° C. ($LiBH_4+LiCl$ solid solution); (4C) 280° C. to 385° C. ($LiBH_4+LiCl$ molten solution); and (4D) after main desorption forming $CaB_6$ and LiH, and precipitation of LiCl.
Figure 4B:
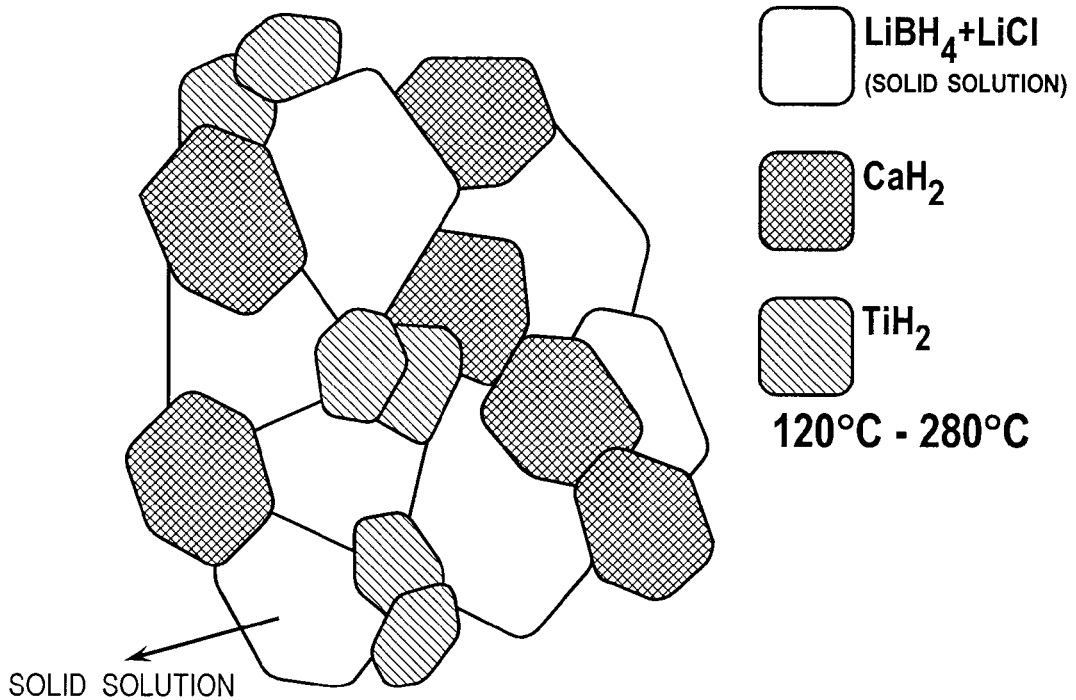

The reaction between LiBH$_4$ and TiCl$_3$ during ball milling forms LiCl through a replacement reaction, forming nanometer sized composite particles of LiBH$_4$+CaH$_2$+LiCl+TiH$_2$ (or Ti(BH$_4$)$_3$), as illustratively depicted in FIG. 4A. As this nano-composite is heated to about 120° C., LiBH$_4$ is transformed from orthorhombic into hexagonal structure, and LiCl subsequently incorporates into h-LiBH$_4$ to form a LiBH$_4$.LiCl solid (up to 280° C.) and molten solution (above 280° C.), as illustratively depicted in FIGS. 4B and 4C. The formation of the LiBH$_4$.LiCl solution changes the thermodynamics and the corresponding hydrogen desorption reaction and lowers the hydrogen desorption temperature from 425° C. (6LiBH$_4$+CaH$_2$ nano-composites) to 385° C.

Figure 4C:
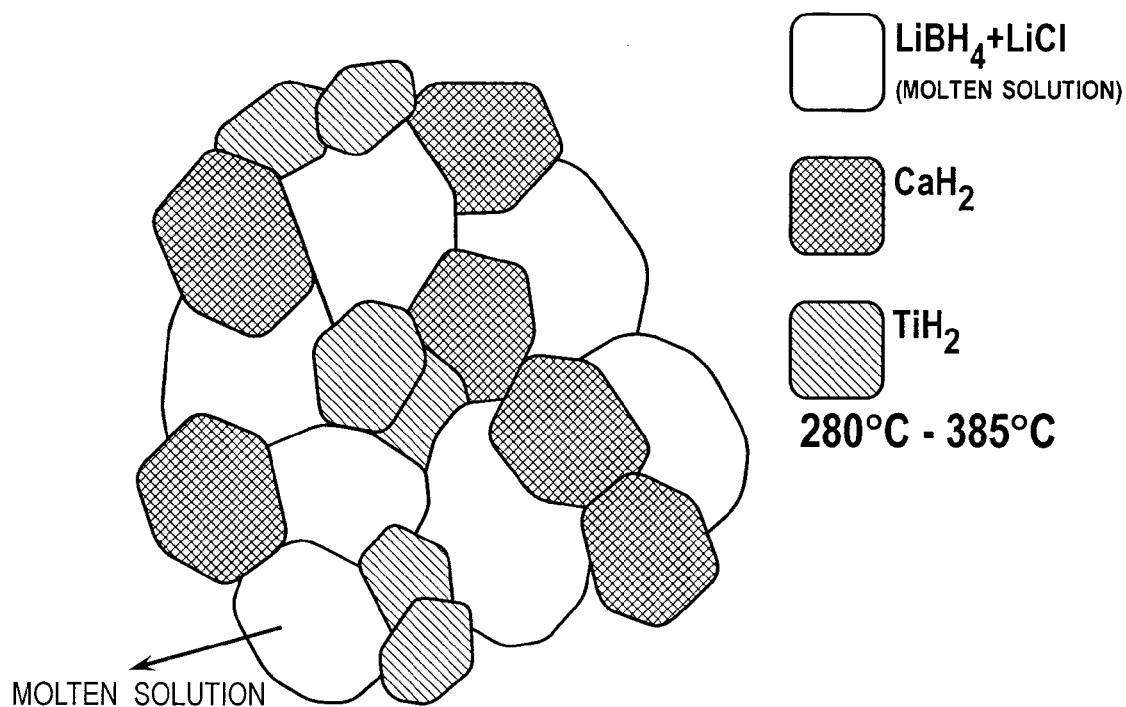
Figure 4D:
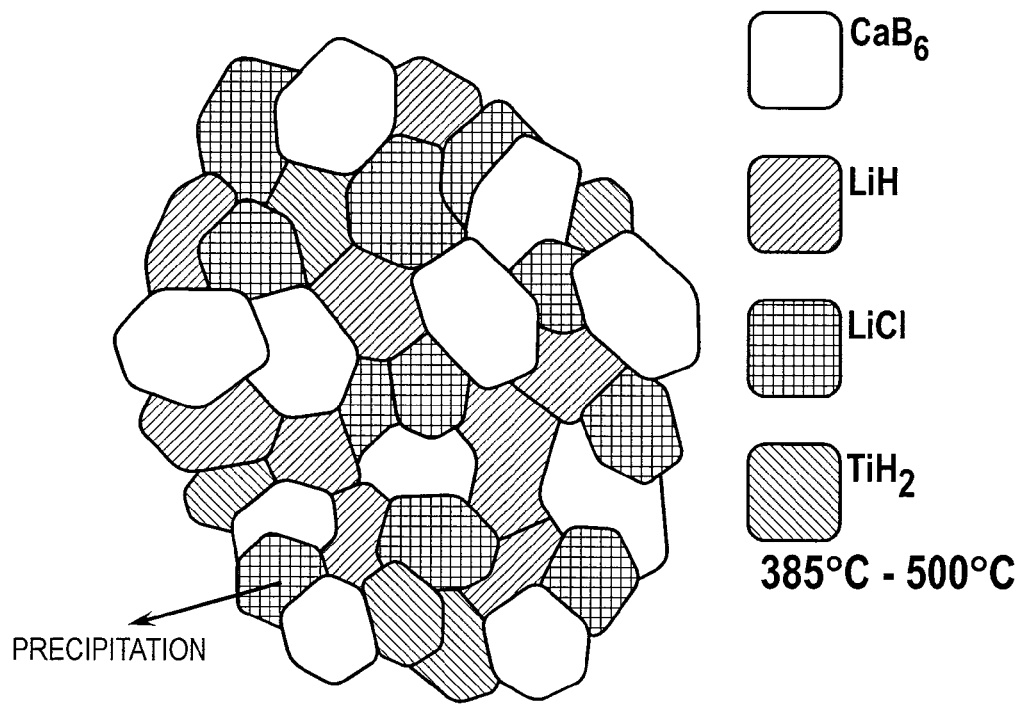

The much improved hydrogen absorption/desorption reversibility of the 6LiBH$_4$+CaH$_2$+0.25TiCl$_3$ nano-composite compared to 6LiBH$_4$+CaH$_2$ nano-composite may result from the micro-structural change due to the incorporation of LiCl into LiBH$_4$, as illustratively depicted in FIGS. 4C and 4D. It is experimentally observed that the incorporation of LiCl into LiBH$_4$ increases the viscosity of the molten LiBH$_4$.LiCl compared to molten LiBH$_4$ at the same temperature. A more viscous LiBH$_4$.LiCl liquid helps to prevent the excessive clustering of the molten LiBH$_4$ and the coalescence of CaH$_2$, preserving the nano-sized phase arrangement in the 6LiBH$_4$+CaH$_2$+0.25TiCl$_3$ nano-composites which shortens the mass transfer distance during the hydrogen desorption reaction and preserves well dispersed CaB$_6$, LiH and LiCl nano-composites. It is also worth mentioning that the preformed TiH$_2$ may further prevent the grain growth of phases during the desorption process.

Similarly, upon recharging, the CaB$_6$ and LiH in the CaB$_6$+LiH+LiCl nano-composite formed during the hydrogen desorption will react to form LiBH$_4$ and CaH$_2$. Once LiBH$_4$ is formed, it will combine with the precipitated LiCl, forming a molten solution of LiBH$_4$.LiCl, which is more viscous than molten LiBH$_4$, preserving the nano-sized phase arrangement in the recharging process. This well-dispersed nano-sized solid-liquid phase arrangement in the 6LiBH$_4$+CaH$_2$+0.25TiCl$_3$ nano-composite helps to realize good reversibility.

In summary, systematic studies of the phase evolution on cycling 6LiBH$_4$/CaH$_2$/xTiCl$_3$ with x=0, 0.05, 0.1, 0.15, 0.2, 0.25 and 0.3 have been performed. Adding TiCl$_3$ and particularly 0.25 TiCl$_3$ produces reversible hydrogen absorption and desorption and a lower desorption temperature. LiCl is produced through replacement reaction between LiBH$_4$ and TiCl$_3$ during ball milling. This LiCl then forms solid solution with LiBH$_4$ at about 120° C. when o-LiBH$_4$ transforms into h-LiBH$_4$. The LiBH$_4$.LiCl solid solution persists up to about 280° C., where a molten solution of LiBH$_4$.LiCl results. This is attributable to the changes in reactant compositions and hence reaction thermodynamics, and to the favorable decrease in hydrogen desorption temperature. On the other hand, the incorporation of LiCl into LiBH$_4$ favorably changes the viscosity of molten LiBH$_4$.LiCl, preserving the nano-sized phase arrangement formed after milling, leading to fast kinetics. Furthermore, the precipitation of LiCl from viscous LiBH$_4$.LiCl molten solution with the consumption of LiBH$_4$ upon hydrogen desorption and its re-incorporation into LiBH$_4$ upon re-hydrogenation generates a well-dispersed liquid-solid nano-sized phase arrangement at the recharging temperature, leading to a fully reversible complex hydrogen storage system at the hydrogen reaction temperature range. The full reversibility of this system is also exemplified by the fact that when the recharged ternary nano-composite is cooled to room temperature slowly, LiCl precipitates from the molten LiBH$_4$.LiCl at temperatures below 120° C. As the temperature is increased in the next desorption, LiCl will re-incorporate into the h-LiBH$_4$ and the above cycle will continue.

While the best mode for carrying out the invention has been described in detail, those familiar with the art to which this invention relates will recognize various alternative designs and embodiments for practicing the invention as defined by the following claims.

What is claimed is:

1. A hydrogen storage material comprising:
 a substantially homogeneous amorphous liquid mixture of a metal borohydride M$^1$(BH$_4$)$_x$ and a metal halide $M^2(H_L)_y$, $M^1$ and $M^2$ each being independently an alkali metal or an alkaline earth metal, and x and y being to charge balance $M^1$ and $M^2$, respectively.

2. The hydrogen storage material of claim 1, further comprising a crystalline solid mixture of a portion of the metal borohydride $M^1(BH_4)_x$ and a portion of the metal halide $M^2(H_L)_y$.

3. The hydrogen storage material of claim 2, wherein the crystalline solid mixture is substantially homogeneous.

4. The hydrogen storage material of claim 2, a weight ratio of the amorphous liquid mixture to the crystalline solid mixture is greater than 1 at a first temperature and is smaller than 1 at a second temperature lower than the first temperature.

5. The hydrogen storage material of claim 1, wherein the metal halide $M^2(H_L)_y$ has a first weight at a first temperature and a second weight at a second temperature, the first temperature being at least 250 degrees Celsius, the second temperature is at least 100 degrees Celsius greater than the first temperature, and a weight difference between the first weight and the second weight being no greater than 10 weight percent.

6. The hydrogen storage material of claim 1, further comprising a metal hydride $M^3H_z$.

7. The hydrogen storage material of claim 1, further comprising a storage vessel including the hydrogen storage material.

8. The hydrogen storage material of claim 1, wherein x and y are each a value smaller than 3.

9. A method comprising:
forming a hydrogen storage material including a substantially homogeneous amorphous liquid mixture of a metal borohydride $M^1(BH_4)_x$ and a metal halide $M^2(H_L)_y$, $M^1$ and $M^2$ each being independently an alkali metal or an alkaline earth metal, and x and y being to charge balance $M^1$ and $M^2$, respectively.

10. The method of claim 9, further comprising, prior to the step of forming the amorphous liquid mixture, forming a crystalline solid mixture of the metal borohydride $M^1(BH_4)_x$ and the metal halide $M^2(H_L)_y$.

11. The method of claim 9, wherein the metal borohydride $M^1(BH_4)_y$ includes a hexagonal metal borohydride [h-$M^1(BH_4)_x$] with one or more lattice cavities.

12. The method of claim 11, wherein at least a portion of the metal halide $M^2(H_L)_y$ is situated within the one or more lattice cavities of the hexagonal metal borohydride [h-$M^1(BH_4)_x$].

13. The method of claim 11, further comprising forming the hexagonal metal borohydride [h-$M^1(BH_4)_x$] from an orthorhombic metal borohydride [o-$M^1(BH_4)_x$].

14. The method of claim 9, further comprising releasing hydrogen from a reaction between the amorphous liquid mixture of the metal borohydride $M^1(BH_4)_x$ and the metal halide $M^2(H_L)_y$ and a metal hydride $M^3H_z$.

15. The method of claim 10, wherein the amorphous liquid mixture is formed at a higher temperature than the crystalline solid mixture.

16. The method of claim 11, wherein the crystalline solid mixture is formed at a higher temperature than the hexagonal metal borohydride [h-$M^1(BH_4)_x$].

17. The method of claim 14, wherein the metal hydride $M^3H_z$ is added after the amorphous liquid mixture is formed.

18. A method comprising:
forming a hexagonal metal borohydride [h-$M^1(BH_4)_x$] at a first temperature;
forming a crystalline solid mixture of the hexagonal metal borohydride [h-$M^1(BH_4)_x$] and a metal halide $M^2(H_L)_y$ at a second temperature higher than the first temperature;
forming an amorphous liquid mixture of at least a portion of the hexagonal metal borohydride [h-$M^1(BH_4)_x$] and at least a portion of the metal halide $M^2(H_L)_y$ at a third temperature higher than the second temperature; and
releasing hydrogen via a reaction between the amorphous liquid mixture and a metal hydride $M^3H_z$ at a fourth temperature higher than the third temperature.

* * * * *